US008749951B2

(12) United States Patent
Falabella et al.

(10) Patent No.: US 8,749,951 B2
(45) Date of Patent: Jun. 10, 2014

(54) TWO-PHASE MIXED MEDIA DIELECTRIC WITH MACRO DIELECTRIC BEADS FOR ENHANCING RESISTIVITY AND BREAKDOWN STRENGTH

(75) Inventors: Steven Falabella, Livermore, CA (US); Glenn A. Meyer, Danville, CA (US); Vincent Tang, Dublin, CA (US); Gary Guethlein, Livermore, CA (US)

(73) Assignee: Lawrence Livermore National Security, LLC

( * ) Notice: Subject to any disclaimer, the term of this patent is extended or adjusted under 35 U.S.C. 154(b) by 385 days.

(21) Appl. No.: 12/748,135

(22) Filed: Mar. 26, 2010

(65) Prior Publication Data

US 2010/0246093 A1 Sep. 30, 2010

Related U.S. Application Data

(60) Provisional application No. 61/163,690, filed on Mar. 26, 2009.

(51) Int. Cl.
*H01G 4/04* (2006.01)
*H01B 3/24* (2006.01)

(52) U.S. Cl.
USPC ............ 361/326; 361/327; 252/570; 252/572

(58) Field of Classification Search
None
See application file for complete search history.

(56) References Cited

U.S. PATENT DOCUMENTS

| | | | | |
|---|---|---|---|---|
| 3,579,163 | A | 5/1971 | Cronin | |
| 3,845,233 | A | 10/1974 | Burton | |
| 4,943,685 | A | 7/1990 | Reynaert | |
| 5,863,455 | A | 1/1999 | Segal | |
| 6,347,033 | B1 | 2/2002 | Minnick et al. | |
| 6,600,645 | B1 * | 7/2003 | Lauf et al. | 361/311 |

OTHER PUBLICATIONS

Ross, et al., "Time Domain Spectroscopic Measurements of the Dielectric Properties of Heterogeneous Materials", Department of Materials Science, pp. 350-355 (1987).

Chiesa, et al., "Experimental investigation of the dielectric and cooling performance of colloidal suspensions in insulating media", Colloids and Surfaces, pp. 88-97 (2008).

* cited by examiner

*Primary Examiner* — Necholus Ogden, Jr.
(74) *Attorney, Agent, or Firm* — James S. Tak

(57) ABSTRACT

A two-phase mixed media insulator having a dielectric fluid filling the interstices between macro-sized dielectric beads packed into a confined volume, so that the packed dielectric beads inhibit electro-hydrodynamically driven current flows of the dielectric liquid and thereby increase the resistivity and breakdown strength of the two-phase insulator over the dielectric liquid alone. In addition, an electrical apparatus incorporates the two-phase mixed media insulator to insulate between electrical components of different electrical potentials. And a method of electrically insulating between electrical components of different electrical potentials fills a confined volume between the electrical components with the two-phase dielectric composite, so that the macro dielectric beads are packed in the confined volume and interstices formed between the macro dielectric beads are filled with the dielectric liquid.

6 Claims, 2 Drawing Sheets

TWO-PHASE MIXED MEDIA DIELECTRIC WITH MACRO DIELECTRIC BEADS FOR ENHANCING RESISTIVITY AND BREAKDOWN STRENGTH

CLAIM OF PRIORITY IN PROVISIONAL APPLICATION

This application claims priority in provisional application filed on Mar. 26, 2009, entitled "Two-Phase Dielectric Media" Ser. No. 61/163,690, by Steven Falabella et al, and incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to electrical insulators, and more particularly to a two-phase mixed media dielectric composite having a dielectric fluid filling the interstices between macro-sized dielectric beads packed into a confined volume, so that the macro dielectric beads inhibit electro-hydrodynamically driven current flows of the dielectric liquid and increase the resistivity and breakdown strength of the two-phase dielectric composite over the dielectric liquid alone.

BACKGROUND OF THE INVENTION

Dielectric fluids such as silicon and carbon based oils are commonly used for high voltage insulation in pulsed and DC applications, such as compact accelerators, over solid insulation due to their reasonable breakdown strengths, low conductivity, self-healing properties, and allowance for disassembly. One problem with dielectric fluids, however, is the generation of leakage currents caused by the motion of dielectric oil (electro-hydrodynamic current-carrying flows) around the high-voltage components. In contrast, solid dielectrics are not vulnerable to such current carrying flows, and can potentially provide significantly higher breakdown strengths and resistivity. At the same time, however, solid insulators lack the self-healing capability (reparability) and flexibility of liquid insulators, and also require careful potting to avoid air bubbles. The serviceable properties of liquid insulation are important especially in experiments and devices where frequent changes, servicing, or breakdowns are likely to occur.

SUMMARY OF THE INVENTION

One aspect of the present invention includes a two-phase dielectric composite for electrically insulating conductive components of different electrical potentials, comprising: a plurality of macro dielectric beads packed into a confined volume between the conductive components to form interstices between said macro dielectric beads; and a dielectric liquid filling the interstices between said macro dielectric beads in the confined volume, wherein said macro dielectric beads are insoluble in said dielectric liquid so as not to be structurally compromised thereby and electrical properties of said dielectric liquid are not compromised by said macro dielectric beads, whereby said packed macro dielectric beads inhibit electro-hydrodynamically driven current flows of said dielectric liquid between the conductive components and increase the resistivity and breakdown strength of said two-phase dielectric composite over said dielectric liquid alone.

Another aspect of the present invention includes a two-phase dielectric composite comprising: a dielectric liquid; and a plurality of macro dielectric beads immersed in said dielectric liquid, said macro dielectric beads having a size greater than about 1 mm in diameter, and of a material type insoluble in said dielectric liquid so as not to be structurally compromised by said dielectric liquid when immersed therein and electrical properties of said dielectric liquid are not compromised by said macro dielectric beads, whereby said packed macro dielectric beads inhibit electro-hydrodynamically driven current flows of said dielectric liquid in the presence of an electric field and increase the resistivity and breakdown strength of said two-phase dielectric composite over said dielectric liquid alone.

Another aspect of the present invention includes an electrical apparatus comprising: a casing surrounding a confined volume; conductive components of different electrical potential disposed within the confined volume; and a two-phase dielectric composite comprising a plurality of macro dielectric beads packed into the confined volume and between the conductive components to form interstices between said macro dielectric beads, and a dielectric liquid filling the interstices between said macro dielectric beads in the confined volume, wherein said macro dielectric beads are insoluble in said dielectric liquid so as not to be structurally compromised by said dielectric liquid and electrical properties of said dielectric liquid are not compromised by said macro dielectric beads, whereby said packed macro dielectric beads inhibit electro-hydrodynamically driven current flows of said dielectric liquid between the conductive components and increase the resistivity and breakdown strength of said two-phase dielectric composite over said dielectric liquid alone.

Another aspect of the present invention includes a method of electrically insulating between conductive components of different electrical potential, comprising: filling a confined volume between the conductive components with a two-phase dielectric composite comprising a dielectric liquid and a plurality of macro dielectric beads that are insoluble in said dielectric liquid so as not to be structurally compromised thereby and electrical properties of said dielectric liquid are not compromised by said macro dielectric beads, wherein said filling step packs said macro dielectric beads in the confined volume between the conductive components to form interstices between said macro dielectric beads which are filled with said dielectric liquid, whereby said packed macro dielectric beads inhibit electro-hydrodynamically driven current flows of said dielectric liquid between said conductive components and increase the resistivity and breakdown strength of said two-phase dielectric composite over said dielectric liquid alone.

BRIEF DESCRIPTION OF THE DRAWINGS

The accompanying drawings, which are incorporated into and form a part of the disclosure, are as follows.

DETAILED DESCRIPTION

Generally, the present invention is a two-phase mixed media dielectric mixture/composite comprising a combination of discrete solid dielectric media (e.g. dielectric beads, such as polypropylene beads) and liquid dielectric media (e.g. dielectric oil, such as silicone oil or mineral oil), and which is designed to retain the volume-filling, self-healing, and serviceability advantages of a liquid insulator, while achieving higher resistivity and breakdown strength provided by solid dielectric beads which are arranged to increase effective flashover distance and obstruct the flow of breakdown initialing particulates in the liquid insulator. The present invention also generally includes an electrical apparatus or system (such as for example high voltage power systems, transformers, reactors, etc.) which incorporates and uses the two-phase mixed media dielectric mixture/composite to insulate between electrical components of different electrical potentials. And the present invention also generally includes a method of insulating electrical components of such electrical systems with the two-phase mixed media dielectric mixture/composite, all of which are described in detail as follows.

In particular, the dielectric beads of the dielectric composite are preferably packed into a confined space or volume (e.g. an enclosure) between electrical components (i.e. conductive components) of different electrical potentials (e.g. electrodes). The packing substantially restricts movement of the dielectric beads within the confined volume and forms interstices between the dielectric beads. The dielectric liquid may be filled into the confined space either after, before, or together with the packing of the beads, such that the dielectric liquid fills the interstices between the beads. It is appreciated that in this packed arrangement the beads are not considered suspended in the liquid, since the beads do not flow with or are otherwise displaceable by liquid flow. By limiting the dielectric liquid flow only through the small passages and interstices between the beads in this manner, the packed dielectric beads operate to inhibit or prevent the physical flow of dielectric fluid between surfaces held at high potential differences (i.e. from high-field regions to ground) caused/driven by electro-hydrodynamics for quasi-DC to DC applications which is a major contribution to the leakage current. Also, since the dielectric oil is free to flow (albeit slowly), the insulation is to a large extent self-healing, unlike solid dielectrics. Furthermore, since the two-phase mixed media is removable (either the liquid alone without disturbing the solid beads or both types together) the electrical apparatus/equipment can be easily serviced.

A. Example Embodiment

Figure 1:
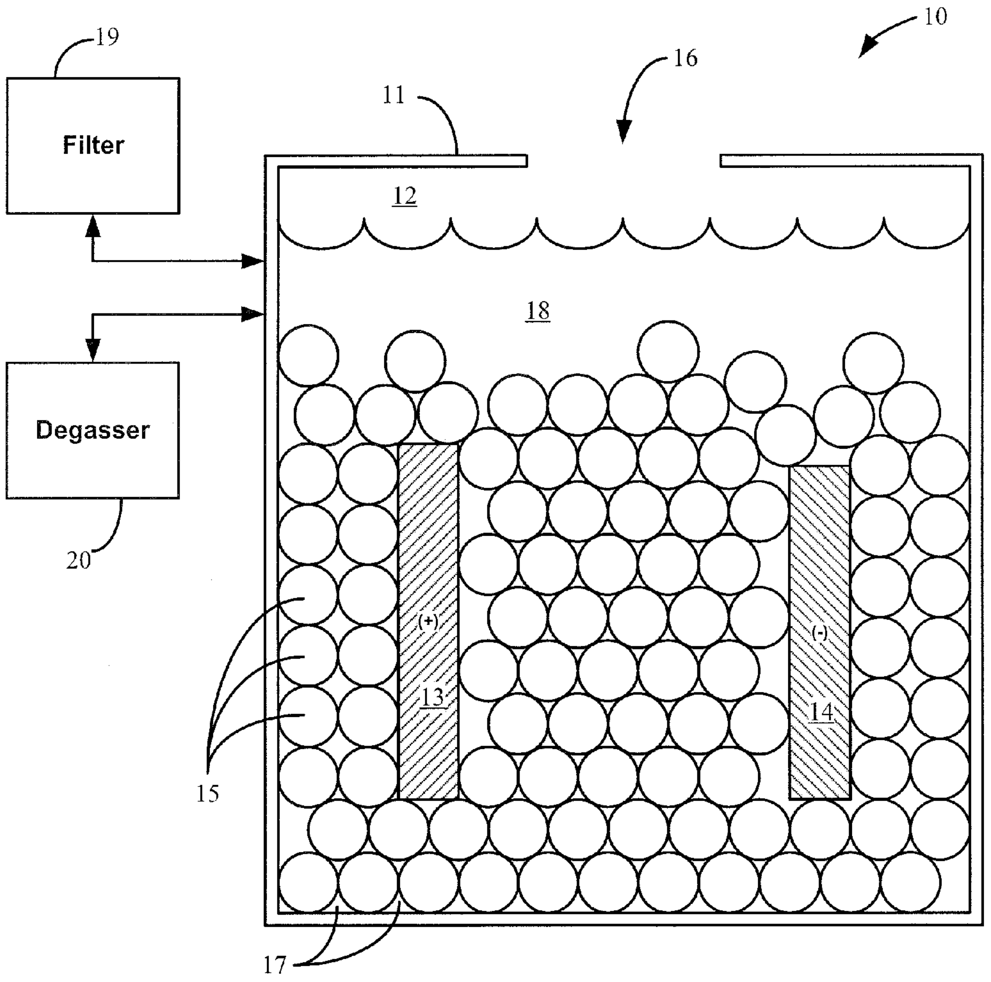
FIG. 1 is a schematic view of an exemplary embodiment of an electrical system of the present invention having a plurality of macro dielectric beads packed into a confined volume of a casing, and a dielectric fluid filling the confined volume and the interstices between the dielectric beads. An optional filter and degasser is also shown fluidically connected to the casing and the confined volume.

FIG. 1 illustrates a schematic of an exemplary embodiment of an electrical system, generally indicated at reference character 10, incorporating the two-phase mixed media insulator to insulate electrical components having different electrical potentials. The electrical system 10 is shown having a casing 11 with a confined volume 12 defined by the casing walls surrounding the confined volume. And disposed in the confined volume 12 are shown two electrodes 13 and 14 of the electrical system separated by a standoff distance. It is appreciated that the electrodes 13 and 14 are schematic representations of various types of electrical arrangements requiring insulation due to potential differences which may exist between its various components. A plurality of macro dielectric beads 15 are shown packed in the confined volume 12 (through opening 16, for example) and between surfaces of the two electrodes 13 and 14 to form interstices (e.g. 17) between the beads 15. It is appreciated that since the space between the electrodes is a sub-volume of the confined volume defined by the casing, such space is also considered a confined volume in which the dielectric beads may be packed. And a dielectric liquid 18 is shown filling the confined volume 12 and the interstices 15 between the beads. FIG. 1 also shows a filtration apparatus 19 (which may include a circulation pump not shown) and a degasser apparatus 20, of conventional types known in the art, which may be fluidically connected to the casing 11 and the confined volume 12 to optionally provide particle filtering and degassing capabilities of the dielectric liquid (either during online operation or during offline servicing), to further enhance resistivity and breakdown strength. Given the packed arrangement of the beads (as well as the macro size of the beads discussed below), the dielectric liquid may be filtered and/or degassed without disturbing the packed plurality of dielectric beads. It is appreciated that while the beads are shown in FIG. 1 settled at the bottom of the casing (suggesting a higher density of the beads over the liquid), the densities of the two phases are not limited and one can be greater than or equal to the other.

The macro dielectric beads 15 are substantially rigid body structures which maintain their shape when packed together such that the interstices 17 may be formed there between. In particular, the dielectric beads are of a material type that is insoluble in the dielectric liquid so as not to be structurally compromised by the dielectric liquid when immersed therein. It is notable, however, that the dielectric beads may be either porous or non-porous, so long as its structural integrity (e.g. rigidity) is substantially maintained when immersed in the dielectric liquid. Exemplary materials used for the dielectric beads include, but are not limited to, plastics, such as for example polypropylene, polyethylene, polystyrene, lexan, acrylics, nylon, etc. and ceramics, such as for example alumina, zirconia, mullite, steatite, etc. Some materials such as for example commercial injection-molded polypropylene feedstock are readily available at low cost.

Furthermore, the term "beads" is used herein and in the claims to broadly describe discrete compact solid pieces, which may also be characterized in the alternative as pellets, spherules, large granules, shot, etc. The dielectric beads 15 are "macro" sized, i.e. greater than nanoscale or microscale, suitably large solid pieces whose individual shapes are discernable by the human eye as discrete individual units. Preferably the macro size of the dielectric beads is greater than about 1 mm in diameter. Some typical bead sizes may include 2 mm and 3 mm beads. As such, the macro dielectric beads are distinguishable from powder-like, micro- or nano-sized solid particles, in that when combined with a dielectric fluid such micro- or nano-sized solid particles typically form a slurry with colloidal or gel-like rheological properties, or are otherwise suspended in the liquid medium, unlike the macro beads of the present invention. It is appreciated that while macro dielectric beads of the present invention are larger than powders and other micro-particles, they are sufficiently small to substantially conform to any geometric space used in industrial electrical systems and are better able to fill small gaps. In particular, in one exemplary embodiment, the dielectric beads are each of a size that is less than a distance between any two points of different electrical potentials, such that no single bead simultaneously contacts any two points of different electrical potentials. This effectively establishes a minimum degree of separation of greater than one intervening bead layer in-between electrical components requiring insulation. And while not limited to any particular shape, substantially spherical beads are used in an exemplary embodiment. And substantially uniformly sized beads or beads of variously selected sizes may be chosen to achieve a desired packing density.

The dielectric liquid 18 used to fill the interstices 17 between the dielectric beads may be selected from various types known in the art, including for example silicon-based oils, e.g. silicone oil; carbon-based oils, e.g. Diala oil, a registered trademark of the Shell Oil Company; mineral-based oils, e.g. mineral oil; and in general any dielectric fluid. Moreover, the dielectric liquid is of a type which does not affect the structural properties/integrity of the macro dielectric beads, and whose electrical properties are in turn not affected or compromised by the dielectric beads. Initial tests of the present invention by Applicants were performed using silicone oil and polyethylene beads, but other combinations are possible. Relative density and dielectric constants of each of the liquid and solid should be considered for media selection in order to avoid buoyancy issues and field enhancements. Generally, the dielectric constants of both the liquid and solid should be kept as low as possible to minimize stored energy, as well as preferably matching the dielectric constants of the solid and liquid. However, if materials having vastly different dielectric strengths are to be selected for the two-phase composite, it is possible to increase breakdown strength by considering the following selection criteria: high strength solid/low strength fluid, with fluid preferably having higher dielectric constant than solid; and low strength solid/high strength fluid, with solid preferably having higher dielectric constant than fluid, based on the principle that the higher dielectric material forces the field to go around it.

B. Experimental Testing

The resistivity and breakdown strength of the two-phase dielectric composite of the present invention was experimentally tested to determine enhancement over dielectric liquid alone. Resistivity was determined as a function of applied electric field and breakdown measurements from experiments involving one possible two-phase insulator configuration comprising: commonly available ~3 mm diameter polypropylene beads used for injection modeling, combined with Dow Corning 561 silicone oil fluid. These two-phase resistivity and breakdown measurements were compared against experiments using only the silicone oil liquid insulator.

Figure 2:
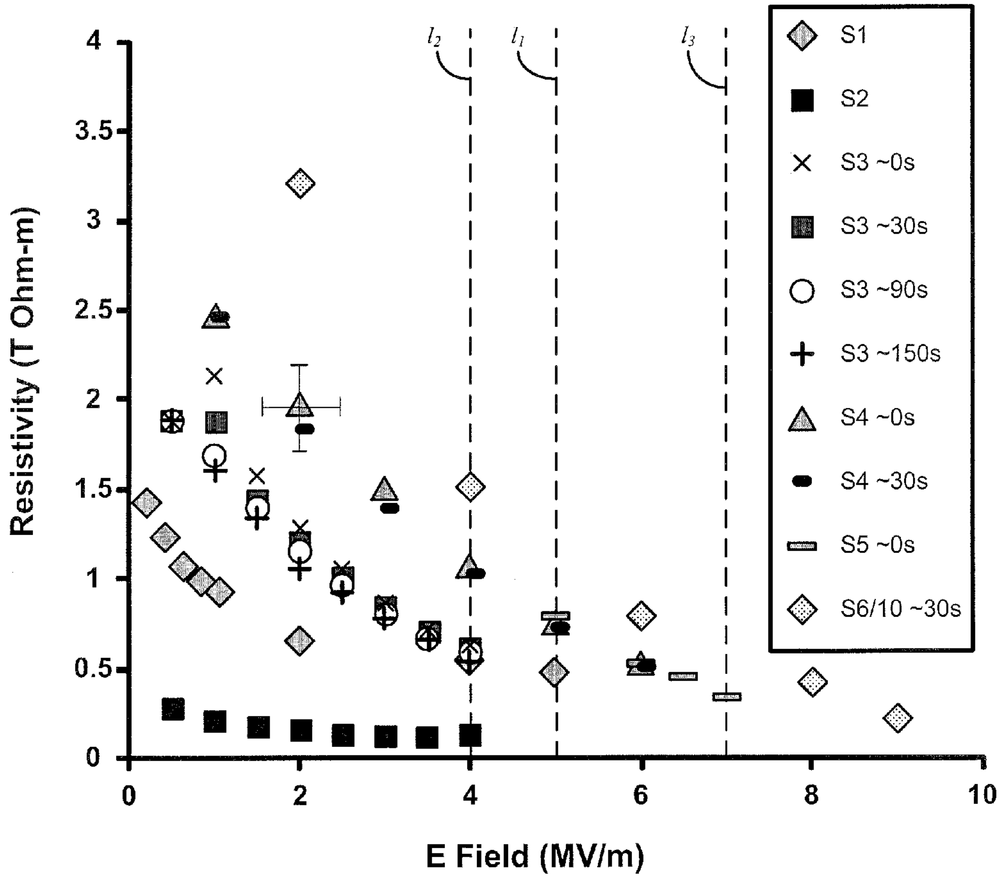
FIG. 2 is a graph showing experimental results of measured resistivity as a function of applied field for various run series (S1-S6) involving silicone oil alone versus a combination of silicone oil and polypropylene beads.

Generally, the two-phase mixed media insulator consisting of packed polypropylene beads and silicone oil was demonstrated to have up to ten times greater resistivity and nearly two times greater breakdown strength compared with the same silicone oil when operated in DC mode. The results are shown in FIG. 2, with the measurements for the series S6 divided by ten for clarity, and the lines $l_1$, $l_2$, and $l_3$ indicating breakdown fields for post-breakdown silicone oil ($l_2$), fresh silicone oil ($l_1$), and the two phase dielectric mixture/composite using the post-breakdown silicone oil ($l_3$).

C. Experimental Test Setup

The resistivity and breakdown of the insulators were tested in a sealed ~23 cm diameter chamber housing two 4.5 cm diameter disc electrodes, a fixed bottom electrode and an adjustable top electrode (not shown). The chamber was capable of being filled with either pure silicone oil or the mixed media dielectric comprising both polypropylene beads and the silicone oil. Additional beads were capable of being added after the chamber was sealed through a tube on the lid. The bottom electrode was connected to a negative high voltage Hiptronics Hi-pot tester which allows voltages up to 150 kV to be applied across the electrode. The top electrode was grounded through a 50 MΩ resistor and connected to a high-impedance 200 MΩ op-amp in a voltage-follower configuration which measures the divided voltage/leakage current and allows the effective resistance of the dielectric in-between the electrodes to be measured. The chamber was grounded in a similar manner and equipped also with an op-amp to measure its leakage current. Mechanically, the chamber was sealed via an o-ring and the liquid portion of the insulator was continuously circulated in a closed loop while offline and in-between experiments. When operated, the pumping system continuously filtered the liquid dielectric through a 15 micron mechanical filter. And the pumping system was also able to continuously degas the liquid using a vacuum pump. However, the results discussed here, unless otherwise noted, only involved mechanical filtering of the liquid dielectric.

D. Baseline Experiments

Silicone Oil Only

The first set of tests consisted of a series of baseline measurements involving the silicone oil only. Previous data indicated that at negligible field strengths fresh silicone oil has a resistivity on the order of 1 to 100 TΩ-m, depending on the water or dissolved gas content. Initial tests at various applied voltages and gap distances using fresh oil indicated a resistivity of ~1-2 TΩ-m at fields of ~0.5 MV/m and a resistivity of ~0.5 TΩ-m at ~4 MV/m. These data were taken after more than a minute of DC operation and steady-state measurements. The circulation pump was turned off for this and all experiments in order to eliminate currents based on imposed flow. The first breakdown occurred at ~5 MV/m, indicated at line $l_1$. This first data set is summarized by Series 1, i.e. S1, in FIG. 2. The resistivity data for this series at fields less than 2 MV/m were taken with a gap distance of 9.4 cm, while the data at 2 MV/m or greater were taken with a gap distance of 1 cm. The resistivities deduced at the lower fields were more approximate since the 1-D assumption inherent in the diagnostic model can be affected by the long gap distance. This long gap distance was only used by this series.

The effective resistivity was shown to become and stay notably lower after the first breakdown even though the oil was circulated in-between runs; in addition the breakdown strength of the fluid lowered to ~4 MV/m, indicated at line $l_2$ in FIG. 2. These data are given by series S2 in FIG. 2. The data were taken a minute after the voltage was applied, with the measurements reaching steady-state. Changes in applied voltage were accomplished slowly using a ~30 s period after operation of 90 s at a particular voltage. A gap distance of 2 cm was used and the voltage was scanned from 10 to 80 kV in steps of 10 kV. Multiple breakdowns did not change the effective resistivity significantly after the first one. These baseline post-breakdown experiments were repeated on multiple days and also with a gap distance of 1 cm with the same results; refilling and circulating the same oil overnight in the closed loop with the mechanical filter also did not change the measurements.

E. Experiments on Two-phase Dielectric

Silicone Oil and Polypropylene Beads

With the baselines established, beads were packed into the same chamber and hence in-between the electrode gap. The same oil without processing was then reinserted into the closed loop chamber.

Effective resistivity data for a first series of experiments with the beads are shown as series S3 on FIG. 2, with measurements from ~0 s, ~30 s, ~90 s, and ~150 s after the voltage was applied using ramp periods of ~30 s and steps of 10 kV. The dwell times have deviation within +5 s/−1 s. A gap distance of 2 cm was again used and the voltage was scanned from 10 to 80 kV. No breakdown occurred.

After the series S3 run, the circulation pump was turned back on for ~15 minutes and turned off again, and a second run, given by series S4 in FIG. 2, was then performed. In series S4, the voltage was scanned from 20-120 kV in steps of 20 kV applied over ~30 s with dwell time of ~30 s at each voltage. No breakdown occurred with this run either.

Lastly, a third run after a similar pre-run oil circulation procedure followed. This run, designed to determine the breakdown limit of the insulator, is given by series S5 in FIG. 2. The voltage was scanned from 100 kV to 140 kV in steps of 10 kV applied over ~30 s with dwell times of only ~5 s at each voltage. A breakdown at 140 kV occurred, indicating breakdown field-strengths of ~7 MV/m, and indicated at line $l_3$ in FIG. 2.

The measured resistivities for the two-phase dielectric mixture/composite were notably higher than for the pure silicone oil data in S1 and S2, especially for the S2 data from oil that have already experienced breakdowns or damage. Hence, the incorporation of solid beads with the "damaged" oil increased the resistivity up to an order of magnitude, and breakdown strengths by nearly a factor of two for DC operation on the order of minutes.

Lastly, initial experiments, given by series S6 in FIG. 2, where the same oil was continuously degassed with a vacuum pump in addition to being mechanically filtered resulted in significantly higher resistivities of 30 to 4 TΩ-m at field strengths of 2 to 9 MV/m respectively. In this case, a gap distance of 1 cm was used.

F. Experimental Results

Based on the experimental results, the two-phase mixed media insulator consisting of packed polypropylene beads and silicone oil was found to have notably better insulator performance in terms of resistivity and breakdown strength compared with silicone oil alone when operated in DC mode. Resistivity values and breakdown strengths up to ten and two times greater respectively were demonstrated. The mixture also has the advantage of a lower effective dielectric constant since polypropylene has a dielectric constant of ~2.3 while silicone oil has a constant of 2.7 at room temperature. Compared with a solid insulator, the major advantage of the two-phase dielectric mixture/composite is that it retains some of the self-healing properties and flexibility of a liquid dielectric, allowing the high voltage components inside the dielectric to be serviced, while still achieving some of the higher breakdown thresholds and resistivities of a solid insulator. Moreover, it could provide significant advantages such as reduced parasitic current losses or increased device compactness for a variety of high voltage applications. For example, these two-phase mixtures could be enabling for compact portable DC accelerators where parasitic currents must be minimized, lifetime is important, and high quasi-DC to DC gradients are required.

While particular operational sequences, materials, parameters, and particular embodiments have been described and or illustrated, such are not intended to be limiting. Modifications and changes may become apparent to those skilled in the art, and it is intended that the invention be limited only by the scope of the appended claims.

We claim:

1. An electrical apparatus comprising:
a casing surrounding a confined volume;
conductive components of different electrical potential disposed within the confined volume; and
a two-phase dielectric composite comprising a plurality of macro dielectric beads greater than about 1 mm diameter packed into the confined volume and between the conductive components to form interstices between said macro dielectric beads, and a dielectric liquid filling the interstices between said macro dielectric beads in the confined volume, wherein said macro dielectric beads are insoluble in said dielectric liquid so as not to be structurally compromised by said dielectric liquid and electrical properties of said dielectric liquid are not compromised by said macro dielectric beads, and wherein said macro dielectric beads and said dielectric liquid have low dielectric constants so that the two-phase dielectric composite has a reduced ability to store charge and increased dielectric strength and resistivity,
whereby said packed macro dielectric beads inhibit electro-hydrodynamically driven current flows of said dielectric liquid between the conductive components and increase the resistivity and breakdown strength of said two-phase dielectric composite over said dielectric liquid alone.

2. The electrical apparatus of claim 1,
wherein said macro dielectric beads are each of a size that is less than a distance between any two points of different electrical potentials, whereby no single bead simultaneously contacts any two points of different electrical potentials.

3. The electrical apparatus of claim 1,
further comprising a filtration device fluidically connected to the confined volume for filtering said dielectric liquid without disturbing said packed plurality of macro dielectric beads.

4. The electrical apparatus of claim 1,
further comprising a degassing device fluidically connected to the confined volume for degassing said dielectric liquid without disturbing said packed plurality of macro dielectric beads.

5. An electrical apparatus comprising:
a casing surrounding a confined volume;
conductive components of different electrical potential disposed within the confined volume; and
a two-phase dielectric composite comprising a plurality of macro dielectric beads greater than about 1 mm diameter packed into the confined volume and between the conductive components to form interstices between said macro dielectric beads, and a dielectric liquid filling the interstices between said macro dielectric beads in the confined volume, wherein said macro dielectric beads are insoluble in said dielectric liquid so as not to be structurally compromised by said dielectric liquid and electrical properties of said dielectric liquid are not compromised by said macro dielectric beads, and wherein said macro dielectric beads are a high breakdown strength solid and said dielectric liquid are a low breakdown strength liquid, with the dielectric liquid having a higher dielectric constant than the beads so as to increase dielectric strength and resistivity, whereby said packed macro dielectric beads inhibit electro-hydrodynamically driven current flows of said dielectric liquid between the conductive components and increase the resistivity and breakdown strength of said two-phase dielectric composite over said dielectric liquid alone.

6. An electrical apparatus comprising:

a casing surrounding a confined volume;

conductive components of different electrical potential disposed within the confined volume; and a two-phase dielectric composite comprising a plurality of macro dielectric beads greater than about 1 mm diameter packed into the confined volume and between the conductive components to form interstices between said macro dielectric beads, and a dielectric liquid filling the interstices between said macro dielectric beads in the confined volume, wherein said macro dielectric beads are insoluble in said dielectric liquid so as not o be structurally compromised by said dielectric liquid and electrical properties of said dielectric liquid are not compromised by said macro dielectric beads, and wherein said macro dielectric beads are a low breakdown strength solid and said dielectric liquid are a high breakdown strength liquid, with the beads having a higher dielectric constant than the beads so as to increase dielectric strength and resistivity, whereby said packed macro dielectric beads inhibit electro-hydrodynamically driven current flows of said dielectric liquid between the conductive components and increase the resistivity and breakdown strength of said two-phase dielectric composite over said dielectric liquid alone.

* * * * *